Nov. 19, 1957  J. M. STOGNER  2,813,695
PLUG VALVE
Filed May 31, 1955
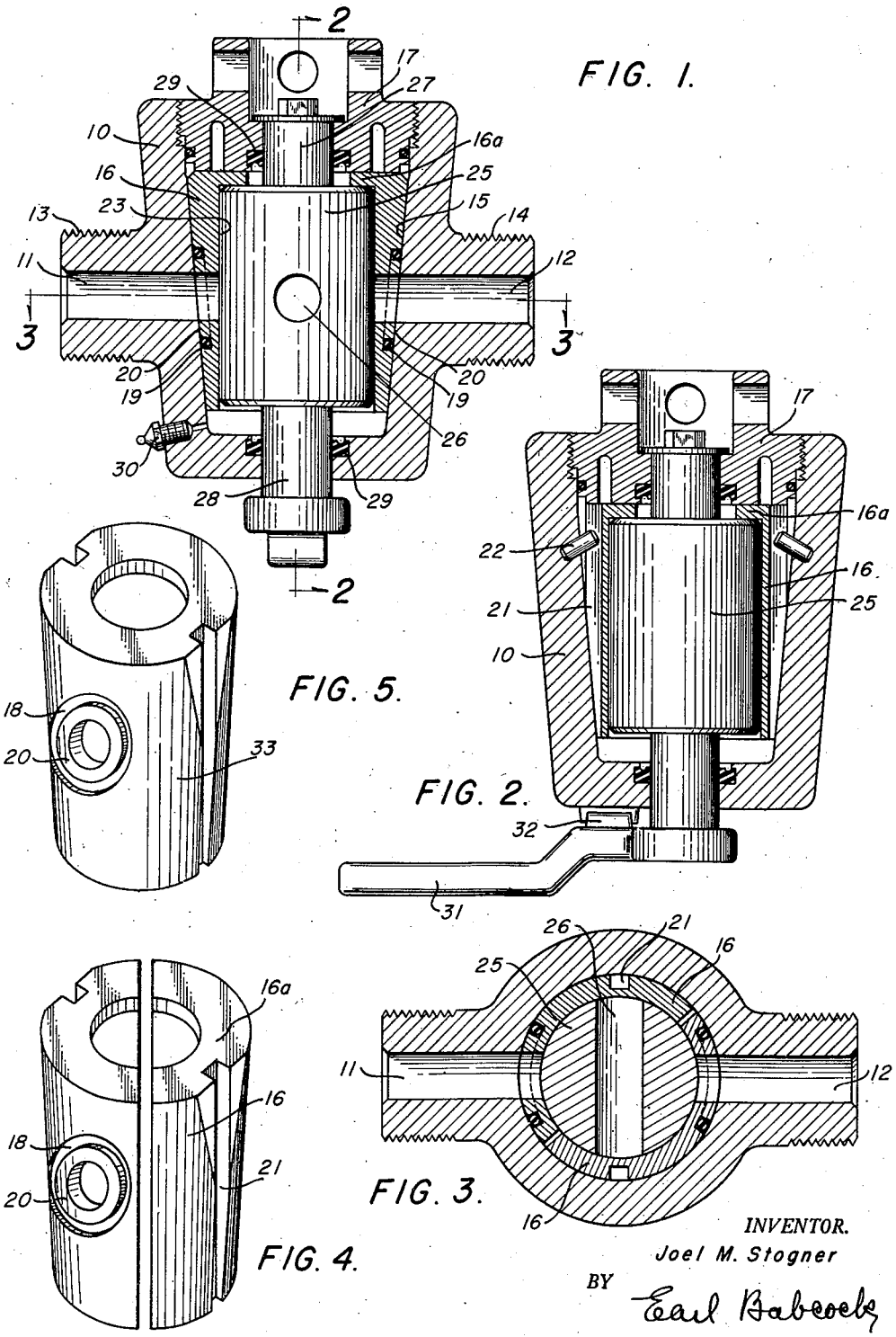
INVENTOR.
Joel M. Stogner
BY
Earl Babcock
ATTORNEY.

United States Patent Office 2,813,695
Patented Nov. 19, 1957

2,813,695

PLUG VALVE

Joel M. Stogner, Duncan, Okla., assignor to Halliburton Oil Well Cementing Company, Duncan, Okla.

Application May 31, 1955, Serial No. 511,979

2 Claims. (Cl. 251—159)

This invention relates generally to plug valves or cocks and more particularly to a high pressure valve of the cylindrical plug type.

Plug valves, of either wood or metal, were of the tapered plug type for hundreds of years. Using early and often crude manufacturing methods, such valves had the advantages of being self lapping, the taper compensating for variations in plug or bore size, and providing the most simple means for promoting intimate and forceful contact between the sealing members of the valve. So practical and efficient is the simple tapered plug valve, that a large majority of all the plug valves manufactured today are of this type.

And is known in the plug valve art, the plug, to prevent leakage when closed, must be sufficiently forced into its bore to insure intimate contact of the matching tapered surfaces. Means of applying this force have included springs, fluid pressure, and various screwed devices. Such a force, applied along the axis of the plug, creates stresses normal to the seating surfaces of the plug and bore, and thus insures this intimate sealing contact. However, the pressure of the held fluid tends to create stresses opposing those that seat the plug in its bore and, as the fluid pressure increases, these opposing stresses also increase, eventually overcoming the seating stresses, which then permits leakage between the plug and its bore. Such leakage is usually prevented by applying a greater force along the axis of the plug either before or during the application of fluid pressures on the valve.

This firm seating of the plug, however, has the great disadvantage of causing greatly increased torque necessary to rotate the plug in its bore. This principle of resistance to rotation between matching tapers is in fact so pronounced that, it other arts, it is actually utilized as a means of power transmission. As an example, the machine tool art uses matching tapers to attach end mills, lathe centers, drills, and other tools. Taper standards have been established, such as the Morse, Brown and Sharpe, and Jarno.

Several methods have been devised to overcome or minimize this problem of high operating torque in high pressure plug valves. Among these are mechanical and hydraulic means of lifting the tapered plug from its seat, performing the rotational operation, and then reseating the plug. This lifting of the plug does greatly reduce operating torque, but has the disadvantages of greater complication and the subjecting of the valve seating surfaces to abrasive contaminants, particularly when handling dirty or gritty fluids. Also used are various methods of forced lubrication between the seating surfaces of the plug and its bore. Such lubrication is helpful, but tends to be diluted and washed out when the fluids handled are miscible with the lubricant. Close fitting cylindrical plugs have been used, often in combination with heavy lubricants, to minimize operational torque. While initially successful, this method requires very close fitting of the plug to its bore and any subsequent wear of the seating surfaces will result in leakage between these surfaces.

The present invention, as herein described, provides a plug valve with the objects of low operational torque, as provided by the cylindrical plug, and the positive contacting means provided by the tapered plug. Said invention further provides means of utilizing the operating fluid pressure to effect a more intimate contact of the seating surfaces.

In accordance with the present invention, it is proposed to provide a valve body with a tapered insert suitably sealed at the inlet and outlet passages of the valve body, the insert being diagonally split and having a cylindrical bore in which a cylindrical plug is mounted for easy rotation. The insert is so arranged as to yield slightly and be reduced in diameter in response to a selected longitudinal force thereon and thus provide an intimate sealing contact between the plug and the insert. The insert is also arranged as to yield slightly under the influence of the pressure on the inlet side of the valve body and additionally maintain a more forceful contact of the sealing surfaces on the inlet side of the cylindrical plug. The insert is also provided with a flange at its base, against which the cylindrical plug abuts so that hydraulic lifting forces on the plug are transmitted to the insert. With such an arrangement the plug does not require a great deal of torque to turn it and at the same time, leakage is effectively prevented.

The objects of the invention will be more apparent from consideration of the following description taken in connection with the accompanying drawings in which:

Figure 1 is a vertical cross-sectional view of a valve constructed in accordance with the principles of the invention;

Figure 2 is a vertical cross-sectional view taken along the line 2—2 of Figure 1, the view being taken at right angles to the showing in Figure 1;

Figure 3 is a horizontal sectional view of Figure 1 taken on the line 3—3 thereof; and Figure 4 is a perspective view of the insert of the valve of Figure 1.

Referring to the drawings in detail, it will be seen that a valve body is shown at 10, the body being provided with inlet and outlet passageways 11 and 12. Fluid may flow through the valve in either direction and the structure of the inlet and outlet passageways 11 and 12, as well as the associated parts, may be the same. For purposes of description it may be assumed that the passageway 11 is the inlet and the passageway 12 is the outlet of the valve body. The valve body may be threaded as illustrated at 13 and 14 to make connections with pipe or other suitable conduit.

It will be seen that the valve body 10 is provided with a tapered bore 15 at right angles to the passageways 11 and 12. Within this tapered bore there is an insert 16 housing a cylindrical plug 25. As shown in Figure 4, this insert 16 is split longitudinally so as to provide two sections. As shown in Figures 3 and 4, the edges of the two sections are diagonal with respect to the passageways 11 and 12. The plug 25 has an ordinary bore 26, and it will be seen that the plug can be rotated 90 degrees without the bore 26 crossing the edges of the two sections of the insert 16. It has an outer tapered or conical surface conforming to the taper of the bore 15. When mounted in the bore 15, it may be forced downwardly by a suitable cap 17 threaded into the top of the tapered bore 15 of the valve body. It is noted that a force thus applied resolves into a normal contacting force between the insert 16 and the plug 25 which will be proportional to the downward force applied.

The insert 16 is provided with two circular grooves 18 which are concentric with the passageways 11 and 12. Suitable O-rings 19 are mounted in these grooves 18 so as to maintain a seal between the bore 15 and the insert 16. The arrangement is such that there is an annular land 20 on each side of the insert 16 concentric with the passageways 11 and 12. These lands 20 may be referred to as the areas which, when subjected to pressure, tend to deform the insert. For example, assuming that the passageway 11 is the inlet of the valve, the land 20 at the left of Figure 1 is subjected to the pressure of the fluid in the passageway 11 when the valve is closed as shown in Figure 1. Due partly to resiliency of the insert 16 and due partly to the reduced sectional area at groove 18, the lands 20 are supported to the remainder of insert 16 with some flexibility. Upon the inlet land 20 being subjected to fluid pressure, said pressure is transmitted to a like area of the interior cylindrical surface of the insert bore 23. This pressure, when applied, is in addition to that imposed by cap 17. Also of note is that the O-rings 19 obviate the need for a lapped contact surface between the insert 16 and the bore 15.

The insert 16 is held against rotation within the valve body at all times. The means for holding it against rotation may be of any suitable form. In the arrangement illustrated in Figure 2, grooves are provided on the insert as shown at 21 and suitable pins 22 are mounted in the valve body 10 and these project into the grooves 21.

The insert 16 is provided with a flange 16a at its base or larger end. As shown in Figure 2, the plug 25 abuts against this flange so that the plug and insert move together, axially, and upwardly, as viewed in Figure 2, when the plug is subjected to hydraulic forces which tend to lift it. The plug 25 has cylindrical projections 27 and 28 thereon for mounting it in the valve body 10 and in the cap 17 as illustrated. Suitable packing is provided as shown at 29 to prevent leakage through the valve body and cap and the spaces between the plug 25 and the packing 29 may be suitably lubricated. A fitting 30 is shown for supplying lubricant to these passages.

In Figures 1, 2, and 3 of the drawing the valve is shown closed. To rotate the valve to the open position a handle 31 is provided. Some means, such as that illustrated at 32, should be provided to limit rotation of the plug to 90°. As viewed in Figure 3, the plug 25 should be rotated in a counterclockwise direction to open it. Means should be provided to prevent the plug from rotating clockwise from the position shown in Figure 3 so as to insure against the bore 26 traveling across the joints of the two sections of insert 16.

From the above description, it will be clear that when the valve illustrated is used in a high pressure line in a closed position, extreme pressure will be exerted on the land 20 found on the inlet side of said valve. The O-ring 19 adjacent that land will prevent the high pressure from being exerted over the area of the insert exterior thereto. Accordingly, the force tending to cause a sealing action between the insert 16 and the plug 25 will be confined to an area on the plug conforming to the area of the land. There will thus be a minimum of leakage between the insert and the plug and the plug can be rotated with very little torque.

This invention, as herein described, may be constructed of any material compatible with structures of this type. It has been found that lower frictional resistance to plug rotation and self lapping qualities of the sliding surfaces are imparted to the structure when the insert 17 is made of a material different from that of the plug 23. Embodiments of this invention have been made using both steel and brass for the insert and steel for the plug. These have been tested to 18,000 p. s. i. and repeatedly operated at 15,000 p. s. i. When controlling alkaline fluids, embodiments of this invention have used steel for the body, machined cast iron for the insert, and steel for the plug.

While only one embodiment of the invention has been described herein, it is obvious that various changes may be made without departing from the spirit of the invention or the scope of the annexed claims.

I claim:

1. A plug valve comprising a valve body having inlet and outlet passageways and a tapered bore transversely disposed with respect to said passageways, a tapered insert disposed in said tapered bore and adapted to be reduced in diameter, said insert having a flange at its base, ports in registry with said passageways and a cylindrical bore transversely disposed with respect to said ports, said insert also having a groove surrounding said body inlet passageway to provide an annular land also surrounding said inlet passageway, said land being in pressurable communication with said inlet passageway, sealing means in said groove, means common to said insert and said body to permit only longitudinal motion therebetween, a cylindrical plug rotatably mounted in said cylindrical bore in such position as to abut against the flange on said insert, and having a passageway therein adapted to be selectively registered with said ports and said body passageways, and means common to said insert and said body to adjustably force said insert into said tapered bore, the arrangement being that such force will provide initial intimate sealing contact of said plug and said insert and that pressure applied to said inlet passageway will provide additional force for such contact.

2. A plug valve as defined in claim 1 in which the insert is split diagonally with respect to the passageways in said body to provide two sections so that the plug can be rotated 90 degrees in the insert without the passageway in the plug crossing the edges of the insert.

References Cited in the file of this patent

UNITED STATES PATENTS

| 668,406 | Holt | Feb. 19, 1901 |
| 2,621,888 | Allen | Dec. 16, 1952 |

FOREIGN PATENTS

| 503,657 | Germany | 1930 |
| 495,826 | Great Britain | 1938 |